No. 812,217. PATENTED FEB. 13, 1906.
L. P. LOWE.
COMBINED GAS WASHER AND SCRUBBER.
APPLICATION FILED MAY 17, 1904.
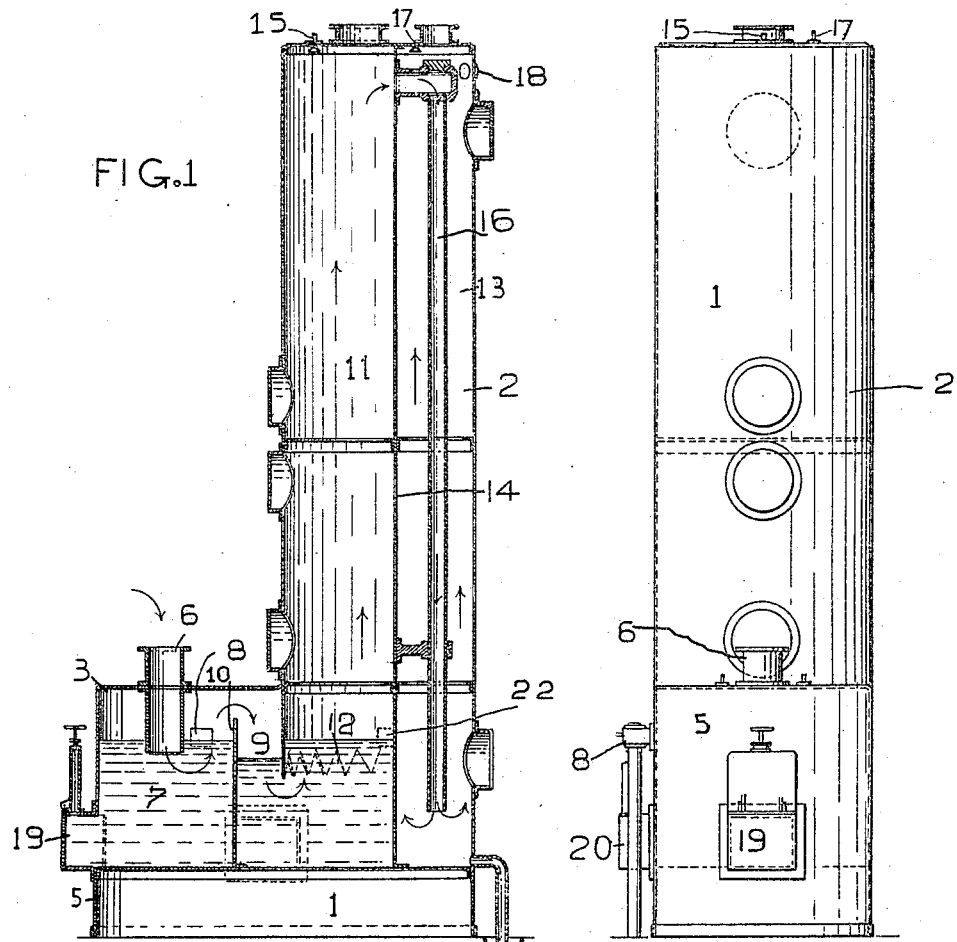
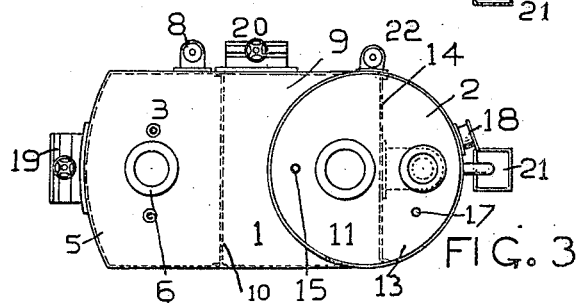
WITNESSES:
INVENTOR:
L. P. Lowe
BY
F. W. Wright
ATTORNEY.

UNITED STATES PATENT OFFICE.

LEON P. LOWE, OF SAN FRANCISCO, CALIFORNIA.

COMBINED GAS WASHER AND SCRUBBER.

No. 812,217.

Specification of Letters Patent.

Patented Feb. 13, 1906.

Application filed May 17, 1904. Serial No. 208,346.

*To all whom it may concern:*

Be it known that I, LEON P. LOWE, a citizen of the United States, residing at San Francisco, in the county of San Francisco and State of California, have invented certain new and useful Improvements in a Combined Gas Washer and Scrubber, of which the following is a specification.

My invention relates to a combined gas washer and scrubber, the object of my invention being to provide in a single shell an apparatus which will effect repeated washings of the gas and will then effect repeated scrubbings of the same, thus effectually cleansing the gas by an apparatus compact and simple in form.

My invention therefore resides in the novel construction, combination, and arrangement of parts for the above ends hereinafter fully specified, and particularly pointed out in the claims.

In the accompanying drawings, Figure 1 is a vertical section of the apparatus. Fig. 2 is a front view of the same. Fig. 3 is a plan view of the same.

Referring to the drawings, 1 represents an L-shaped casing, of which the upright portion 2 is cylindrical in form and forms the scrubbing-chamber for the gas, while the horizontal member 3 is substantially rectangular in form and forms the primary gas-washing chamber. The outer end of said member 3, however, is convex, as shown at 5. 6 represents the inlet-pipe for the gas, which discharges below the water-level in the first washing-chamber 7, said water-level being determined by the overflow 8. The first washing-chamber is separated from the second washing-chamber 9 by a transverse partition 10. The second washing-chamber communicates with the lower portion of the first scrubbing-chamber 11, the communication being below the serrated lower edge of the semicylindrical wall 12 of said scrubbing-chamber, which wall does not extend to the bottom of said chamber. The cylindrical shell of the scrubbing-chamber is divided into two scrubbing-chambers 11 and 13 by a transverse vertical wall 14. The gas is thus compelled to pass upward in the first scrubbing-chamber and subjected to the scrubbing action of water dropping from a spray 15 in the top of said chamber. The gas then passes by a pipe 16 to the bottom of the second scrubbing-chamber, where it emerges and again ascends, being acted upon by water from a spray 17 in said second chamber.

18 is the outlet for the gas.

19 and 20 are gates for removing the residual deposits.

21 is a trap to prevent the escape of gas from the scrubbing-chamber.

22 is the overflow from the scrubbing-chamber.

By means of this construction the complete cleaning of the gas can be effected without the necessity of an unduly extensive and elaborate apparatus.

I claim—

1. In a device of the character described, the scrubber comprising a vertical shell, a vertical partition therein dividing the same into two chambers, a spray operating in the first chamber, a pipe conducting the gas from the top of said first chamber to the bottom of the second chamber, and a spray operating in the second chamber, substantially as described.

2. The combined gas washer and scrubber comprising a substantially L-shaped shell, the horizontal member being provided with an overflow, a gas-inlet extending below the level of the overflow, and a transverse partition dividing the horizontal member into two chambers, the shell of the vertical member on the side next the horizontal member being extended below the top of said horizontal member but not to the bottom thereof, a vertical partition in said vertical member dividing it into two chambers, a spray in the first chamber, a gas-pipe leading from the top of said first chamber to the bottom of the second chamber, and a spray in the second chamber, substantially as described.

In witness whereof I have hereunto set my hand in the presence of two subscribing witnesses.

L. P. LOWE.

Witnesses:
 FRANCIS M. WRIGHT,
 BESSIE GORFINKEL.